United States Patent
Dyba et al.

(10) Patent No.: US 9,369,342 B2
(45) Date of Patent: Jun. 14, 2016

(54) CONFIGURING CAPTIVE PORTALS WITH A CLOUD SERVICE

(71) Applicants: Adam R. Dyba, Redmond, WA (US); Piyush Goyal, Redmond, WA (US); James Christopher Gray, Redmond, WA (US); Shai Guday, Redmond, WA (US); Thomas W. Kuehnel, Seattle, WA (US); Triptpal Singh Lamba, Bothell, WA (US); David Neil MacDonald, Seattle, WA (US); Darya Mazandarany, Kirkland, WA (US); Saumaya Sharma, Seattle, WA (US)

(72) Inventors: Adam R. Dyba, Redmond, WA (US); Piyush Goyal, Redmond, WA (US); James Christopher Gray, Redmond, WA (US); Shai Guday, Redmond, WA (US); Thomas W. Kuehnel, Seattle, WA (US); Triptpal Singh Lamba, Bothell, WA (US); David Neil MacDonald, Seattle, WA (US); Darya Mazandarany, Kirkland, WA (US); Saumaya Sharma, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/081,214

(22) Filed: Nov. 15, 2013

(65) Prior Publication Data
US 2015/0142947 A1    May 21, 2015

(51) Int. Cl.
| | |
|---|---|
| G06F 15/177 | (2006.01) |
| H04L 12/24 | (2006.01) |
| H04L 29/08 | (2006.01) |
| H04W 12/08 | (2009.01) |
| H04L 12/26 | (2006.01) |
| H04W 24/00 | (2009.01) |
| H04L 29/06 | (2006.01) |
| H04W 24/02 | (2009.01) |

(52) U.S. Cl.
CPC ........ *H04L 41/0853* (2013.01); *H04L 43/0876* (2013.01); *H04L 67/34* (2013.01); *H04W 12/08* (2013.01); *H04W 24/00* (2013.01); *H04L 41/0253* (2013.01); *H04L 63/02* (2013.01); *H04L 63/10* (2013.01); *H04W 24/02* (2013.01)

(58) Field of Classification Search
USPC .......... 709/203, 212, 219, 220, 225, 229, 224
See application file for complete search history.

(56) References Cited

U.S. PATENT DOCUMENTS

| | | | | |
|---|---|---|---|---|
| 8,126,963 | B1 * | 2/2012 | Rimmer | 709/203 |
| 8,347,355 | B2 * | 1/2013 | Mower et al. | 726/3 |
| 8,514,828 | B1 * | 8/2013 | Verma et al. | 370/338 |

(Continued)

FOREIGN PATENT DOCUMENTS

CA    2775804 A1    7/2012

OTHER PUBLICATIONS

"About Challenge Based Auth (Captive Portal)", Retrieved at <<https://bto.bluecoat.com/sgos/ThreatPulse/ThreatPulseAccessMethodsWebGuide/Content/Deployment/Concepts/AuthDetail/about_captport_co.htm>>, Retrieved Date: May 21, 2013, 3 pages.

(Continued)

*Primary Examiner* — Michael Y Won
(74) *Attorney, Agent, or Firm* — Judy Yee; Micky Minhas (57) ABSTRACT

Embodiments provision captive portals on network access points (NAPs). In response to a request from a NAP owner, a cloud service associates a NAP with the NAP owner and provides a control channel for configuring the NAP. The NAP owner inputs configuration settings describing the captive portal. The cloud service processes the configuration settings to generate configuration data. The cloud service transmits the configuration data to the NAP. The NAP applies the configuration data to configure the NAP. Some embodiments configure Wi-Fi hotspots with captive portals for gated access to the Internet.

20 Claims, 4 Drawing Sheets

(56) References Cited

U.S. PATENT DOCUMENTS

| | | | |
|---|---|---|---|
| 8,537,715 | B1* | 9/2013 | Vadivelu .................... 370/252 |
| 8,966,407 | B2* | 2/2015 | Shacham et al. ............. 715/864 |
| 2003/0140256 | A1 | 7/2003 | Hauenstein et al. |
| 2007/0112948 | A1* | 5/2007 | Uhlik .......................... 709/223 |
| 2008/0209537 | A1 | 8/2008 | Wong et al. |
| 2009/0031255 | A1* | 1/2009 | Kidd ........................... 715/845 |
| 2009/0061870 | A1* | 3/2009 | Finkelstein et al. ........ 455/435.2 |
| 2010/0070256 | A1* | 3/2010 | Nilsson et al. .................. 703/13 |
| 2012/0210011 | A1 | 8/2012 | Liu et al. |
| 2012/0246553 | A1 | 9/2012 | Ong |
| 2013/0058274 | A1* | 3/2013 | Scherzer et al. ............. 370/328 |
| 2013/0103836 | A1* | 4/2013 | Baniqued et al. ............ 709/226 |
| 2013/0111024 | A1* | 5/2013 | Setia et al. ................... 709/225 |
| 2014/0068030 | A1* | 3/2014 | Chambers et al. ........... 709/220 |
| 2014/0189808 | A1* | 7/2014 | Mahaffey et al. ................ 726/4 |
| 2014/0344890 | A1* | 11/2014 | Warrick et al. .................. 726/1 |
| 2015/0052192 | A1* | 2/2015 | Chauhan ...................... 709/203 |
| 2015/0142947 | A1* | 5/2015 | Dyba et al. ................... 709/224 |
| 2015/0237002 | A1* | 8/2015 | Baniqued et al. ............. 709/220 |

OTHER PUBLICATIONS

"Meraki for Service Providers: Captive Portal Configuration", Retrieved at <<http://www.meraki.com/lib/pdf/meraki_whitepaper_captive_portal.pdf>>, Meraki Solution Guide: Captive Portal Configuration, Jul. 2012, 13 pages.

"International Search Report & Written Opinion Received for PCT Patent Application No. PCT/US2014/065585", Mailed Date: Mar. 6, 2015, 9 Pages.

"Alcatel-Lucent OmniAccess Guest Manager, Easy, Scalable and Secure Guest Access", Published on: Dec. 31, 2012, Available at: http://www.alcatel-lucent.de/enterprise/ipush/ipush120/OmniAccess-Guest-Manager_DS_EN.pdf.

* cited by examiner

CONFIGURING CAPTIVE PORTALS WITH A CLOUD SERVICE

BACKGROUND

The availability of network access points, such as wireless fidelity (Wi-Fi) hotspots, has increased significantly. Many of these Wi-Fi hotspots are gated and require user intervention for connection to the Internet or other networks via click-through interfaces. For example, when a user of a mobile device accesses the Internet at a hotel, the mobile device is redirected by the Wi-Fi hotspot to a captive portal web page. The captive portal web page may present advertisements, receive acceptance of terms and/or conditions of use, present confirmation screens, accept text input, and the like, before allowing the user to connect to the Internet. Such captive portal functionality, however, is not enabled by default with the Wi-Fi hotspots. Further, creating and configuring the captive portals remains a cumbersome and difficult task that is often left to the owner of a business wanting to provide Wi-Fi access to customers.

SUMMARY

Embodiments of the disclosure provision a captive portal associated with a network access point (NAP). A cloud service receives, from a NAP owner device, a NAP identifier and a NAP owner identifier. The cloud service provides a control channel to the NAP owner device and receives, from the NAP owner device via the provided control channel, configuration settings for a captive portal associated with the NAP. The captive portal provides access to a network. The cloud service processes the received configuration settings to generate configuration data for the NAP. The cloud service transmits the generated configuration data from the cloud service to the NAP. The NAP applies the transmitted configuration data to configure the NAP.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable setup, configuration, and/or maintenance of captive portals 202 implemented on network access points (NAPs) 110 via a cloud service 104. Setup of the captive portal 202 includes, for example, associating a new NAP 110 or a new captive portal 202 with a NAP owner 206 and/or NAP owner device 204. Configuration includes, for example, defining access characteristics of the captive portal 202. Maintenance includes, for example, monitoring and/or filtering network traffic based on the defined access characteristics, viewing log files, monetizing network access, and the like.

In some embodiments, the cloud service 104 provides authentication and/or authorization services to the NAP 110. The cloud service 104 may also attempt to monetize the network access on behalf of the NAP owner if the NAP 110 provides access to a particular user group (e.g., subscribers of service providers). The cloud service 104 may also enable the NAP 110 to share access through the captive portal 202 among different devices without having each device authenticate separately (e.g., mobile telephone, tablet, gaming console), such as with a token or other shared secret.

Aspects of the disclosure further enable simplified setup, configuration, and maintenance of the NAPs 110 by the NAP owners 206 in part by abstracting the details of such operations from the NAP owners 206. Aspects of the disclosure further enable the NAP owners 206 to attract customers to businesses with the promise of wireless fidelity (Wi-Fi) access. The NAP owners 206 can also serve advertisements to users 106 to monetize the Wi-Fi access, while content owners (e.g., mobile operators) target the users 106 with advertisements by offering to subsidize Wi-Fi access at particular businesses in return for delivering the advertisements. In operation, some embodiments customize the captive portals 202 (e.g., landing pages) based on credentials supplied by the users 106.

Figure 1:
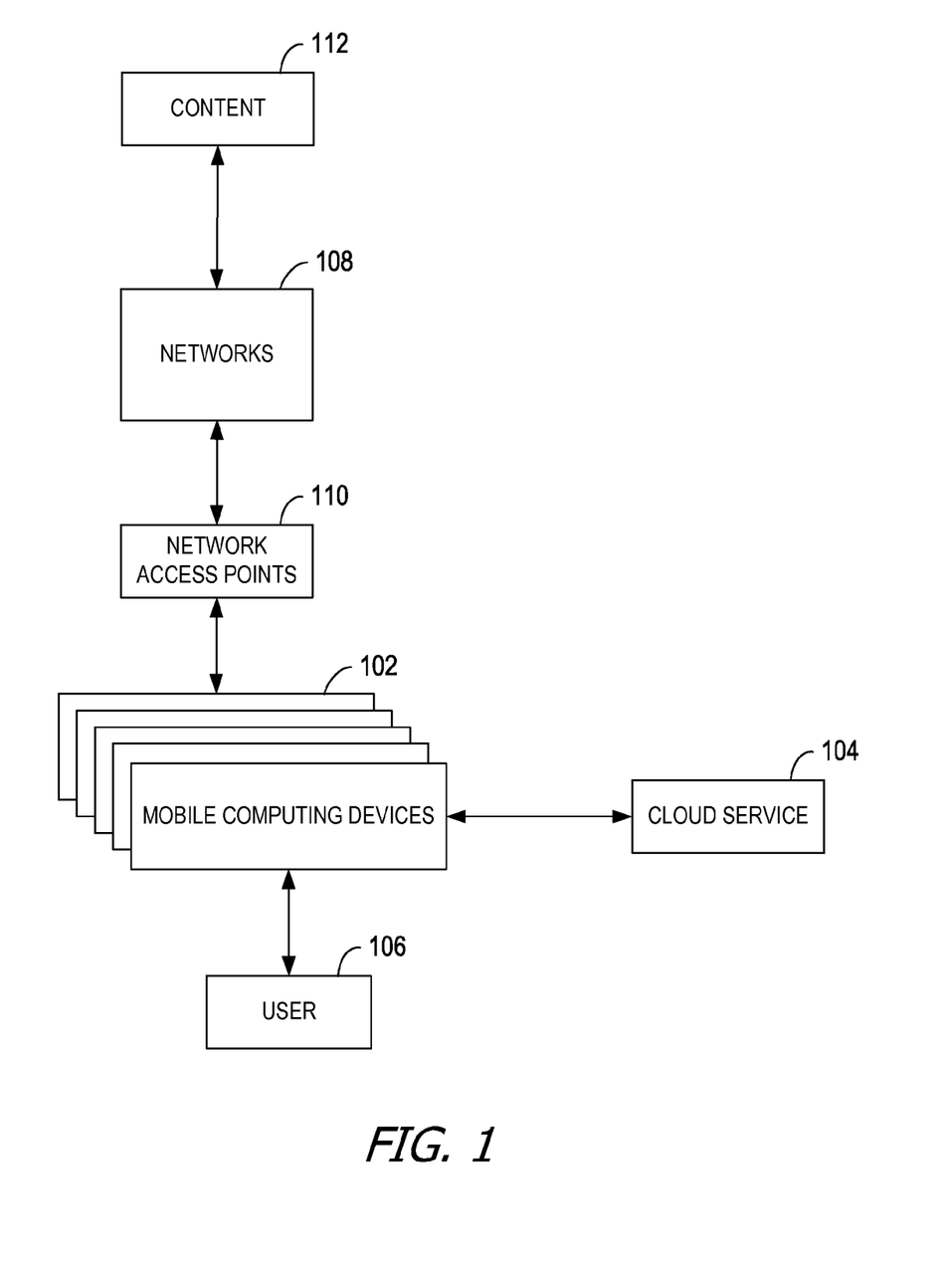
FIG. 1 is an exemplary block diagram illustrating a cloud service communicating with mobile computing devices that connect to networks.

Referring next to FIG. 1, an exemplary block diagram illustrates the cloud service 104 communicating with mobile computing devices 102 that connect to networks 108. In the example of FIG. 1, the user 106 interacts with the mobile computing device 102, or any other computing device of the user 106, to access content 112 via the network 108. The mobile computing device 102 connects to one or more of the networks 108 through one or more NAPs 110, such as a Wi-Fi beacon and a cellular tower. For each NAP 110, the mobile computing device 102 may execute one or more instructions, or otherwise perform a series of actions or commands 414, to gain access, via the NAP 110, to the network 108 associated with the NAP 110. After gaining access to the network 108 through the NAP 110, the mobile computing device 102 is able to transmit and receive the content 112. In this manner, the NAP 110 acts as a captive portal 202.

Communication between the mobile computing device 102 and other devices may occur using any protocol or mechanism over any wired or wireless connection. For example, the mobile computing device 102 may attempt to transmit and/or receive data over a Wi-Fi network, a cellular network, a satellite network, a whitespace network, or any network 108. In some embodiments, a NAP 110 is defined to include all NAPs 110 that share the same service set identifier (SSID) within a particular geographic area (e.g., 100-meter radius). For example, a plurality of NAPs 110 within an airport may share the same SSID.

Figure 2:
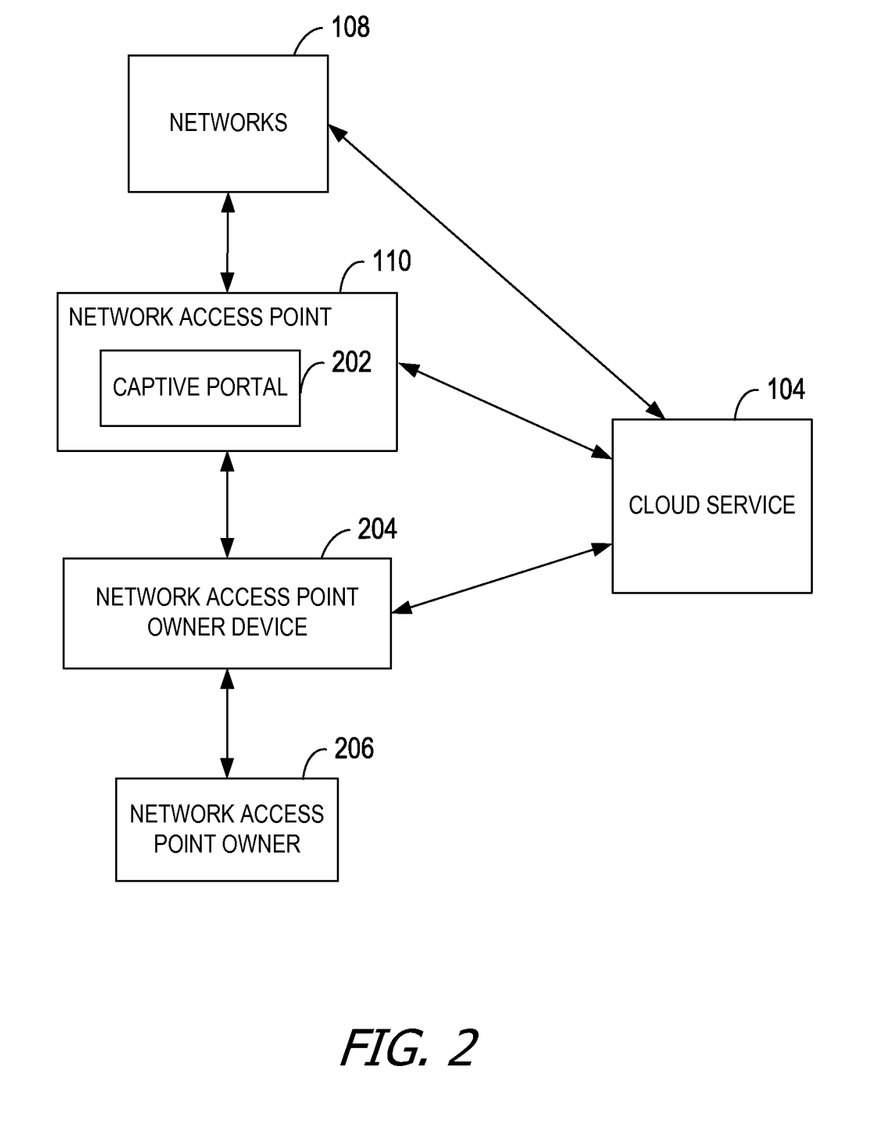
FIG. 2 is an exemplary block diagram illustrating a cloud service communicating with a network access point owner device to configure a network access point implementing a captive portal.

Referring next to FIG. 2, an exemplary block diagram illustrates the cloud service 104 communicating with the NAP owner device 204 to configure the NAP 110 implementing the captive portal 202. In the example of FIG. 2, the NAP owner device 204 includes any computing device of the NAP owner 206, such as a laptop, tablet, mobile telephone, and the like. The NAP owner device 204 is in communication with the NAP 110 and the cloud service 104. For example, the NAP owner device 204 may connect to the NAP 110 via a wired or wireless connection, and may be co-located with the NAP 110 (e.g., in the same room, at the same location of a business entity) or remote from the NAP 110.

The NAP owner device 204 communicates with the cloud service 104 to configure the NAP 110 as described herein, but is also capable of communication with the NAP 110 to configure the NAP 110. In some examples, the NAP owner device 204 sends the configuration settings to the cloud service 104, and the cloud service 104 transmits configuration data 310 to the NAP 110 to configure the NAP 110. In other examples, the NAP owner device 204 sends the configuration settings to the cloud service 104, and the cloud service 104 transmits the configuration data 310 to the NAP owner device 204. The NAP owner device 204 then applies the configuration data 310 to the NAP 110 to configure the NAP 110.

The NAP 110 implements one or more of the captive portals 202. The captive portals 202 gate access to the networks 108. In some embodiments, the captive portals 202 provide authentication services and/or authorization services to determine which mobile computing devices 102 are allowed to access the networks 108.

Aspects of the disclosure are operable with different configurations of the NAP 110. In one example, all network traffic between the mobile computing devices 102 and the networks 108 is routed via the cloud service 104. In such an example, the NAP 110 routes the network traffic from the mobile computing devices 102 to the cloud service 104, and the cloud service 104 routes the network traffic to the networks 108. The captive portal 202 implemented by the NAP 110 thus acts as a virtual private network (VPN) endpoint to the cloud service 104. In this example, the cloud service 104 is able to directly monitor and adjust the network traffic (e.g., based on the usage rules described below).

In another configuration, the control traffic is routed from the NAP owner device 204 to the cloud service 104, but all other network traffic is routed from the NAP 110 to the networks 108.

Figure 3:
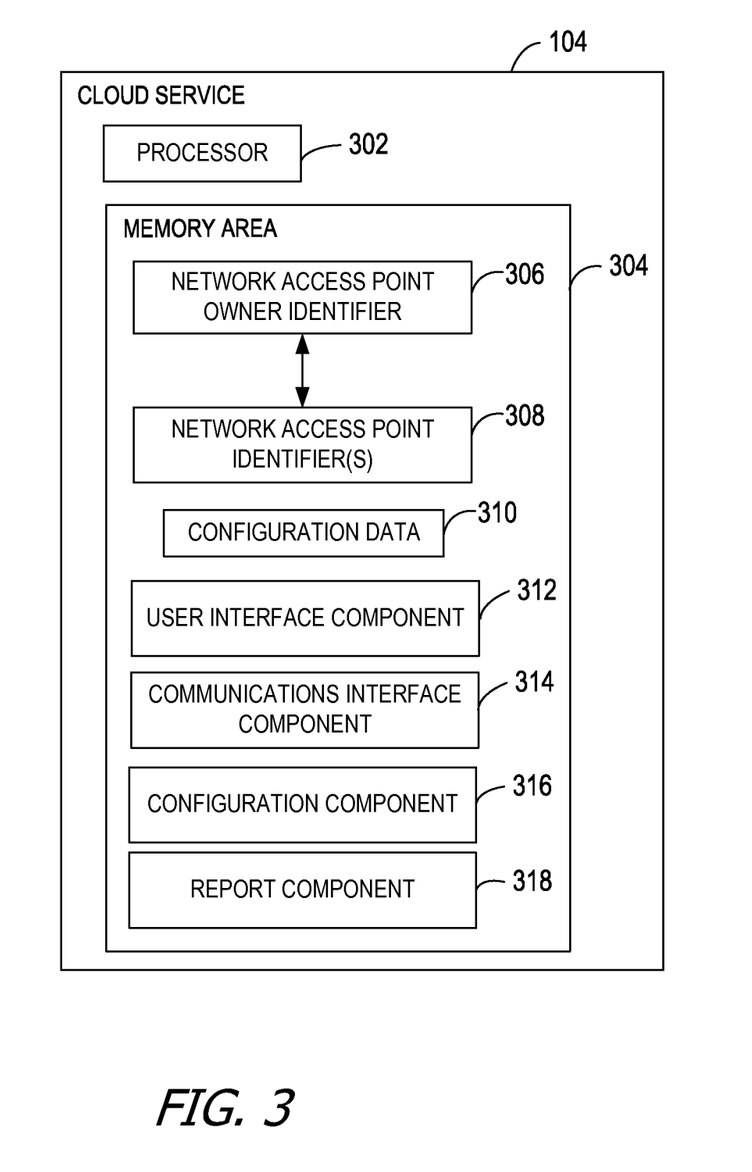
FIG. 3 is an exemplary block diagram illustrating a cloud service storing configuration data associated with a captive portal implemented by a network access point.

Referring next to FIG. 3, an exemplary block diagram illustrates the cloud service 104 storing the configuration data 310 associated with the captive portal 202 implemented by the NAP 110. In the example of FIG. 3, the cloud service 104 provisions the captive portal 202 associated with one of the NAPs 110. The cloud service 104 represents any device executing instructions (e.g., as application programs, operating system functionality, or both) to implement the operations and functionality associated with the cloud service 104. Such a device may also be a peer device to the mobile computing devices 102. The cloud service 104 may also represent a group of processing units or other computing devices. In another example, the cloud service 104 may include a mobile computing device or any other portable device, such as a mobile telephone, laptop, tablet, computing pad, netbook, gaming device, and/or portable media player. Alternatively or in addition, the cloud service 104 may include less portable devices such as desktop personal computers, kiosks, tabletop devices, industrial control devices, wireless charging stations, and electric automobile charging stations.

In some embodiments, the cloud service 104 has at least one processor 302 and a memory area 304. The processor 302 includes any quantity of processing units, and is programmed to execute computer-executable instructions for implementing aspects of the disclosure. The instructions may be performed by the processor 302 or by multiple processors associated with the cloud service 104. In some embodiments, the processor 302 is programmed to execute instructions such as those illustrated in the figures (e.g., FIG. 4).

In some embodiments, the processor 302 represents an implementation of analog techniques to perform the operations described herein. For example, the operations may be performed by an analog computing device and/or a digital computing device.

The cloud service 104 further has one or more computer readable media such as the memory area 304. The memory area 304 includes any quantity of media associated with or accessible by the cloud service 104. The memory area 304 may be internal to the cloud service 104 (as shown in FIG. 3), external to the cloud service 104 (not shown), or both (not shown). In some embodiments, the memory area 304 includes read-only memory and/or memory wired into an analog computing device.

The memory area 304 stores, among other data, correlations between NAP owner identifiers 306 and NAP identifiers 308. That is, the correlations relate each of the NAP owners 206 to one or more of the NAPs 110. In this manner, the cloud service 104 is able to determine which NAPs 110 are associated with which NAP owners 206. For example, one of the NAP owners 206 may install a plurality of NAPs 110 in a particular location, and the memory area 304 stores correlations between the NAP owner identifier 306 and the plurality of the NAP identifiers 308.

The memory area 304 further stores the configuration data 310 for each of the NAPs 110. The configuration data 310, for each of the NAPs 110, is generated from configuration settings provided by the NAP owner 206 (e.g., transmitted via the NAP owner device 204). The configuration settings describe the network access characteristics desired by the NAP owner 206. For example, the NAP owner 206 may describe Wi-Fi characteristics.

The configuration data 310 generated from the configuration settings includes code, such as extensible markup language (XML) expressions, that is applied to the NAP 110 to configure the NAP 110. In some embodiments, the configuration data 310 defines one or more usage rules describing conditions of access by the mobile computing devices 102 to the networks 108 through one or more of the captive portals 202 implemented by the NAP 110. For example, the usage rules may define one or more of the following: maximum data rate, maximum cumulative network data consumption before throttling of network connections occurs, maximum time duration for access by each of the users 106, maximum quantity of simultaneous users 106, times during which network access through the captive portal 202 is allowed, and/or times during which network access through the captive portal 202 is not allowed. The usage rules may also define opt-out conditions to prevent, prohibit, or otherwise deny access to the network 108 through the captive portal 202 for particular users 106 or groups of users 106. Other conditions of access not specifically described herein are within the scope of the configuration data 310.

The cloud service 104 further stores computer-executable components in the memory area 304. The components include a user interface component 312, a communications interface component 314, a configuration component 316, and a report component 318. In some embodiments, the communications interface component 314 includes a network interface card and/or computer-executable instructions (e.g., a driver) for operating the network interface card. Operation of these components, when executed, is described below with reference to FIG. 4.

Figure 4:
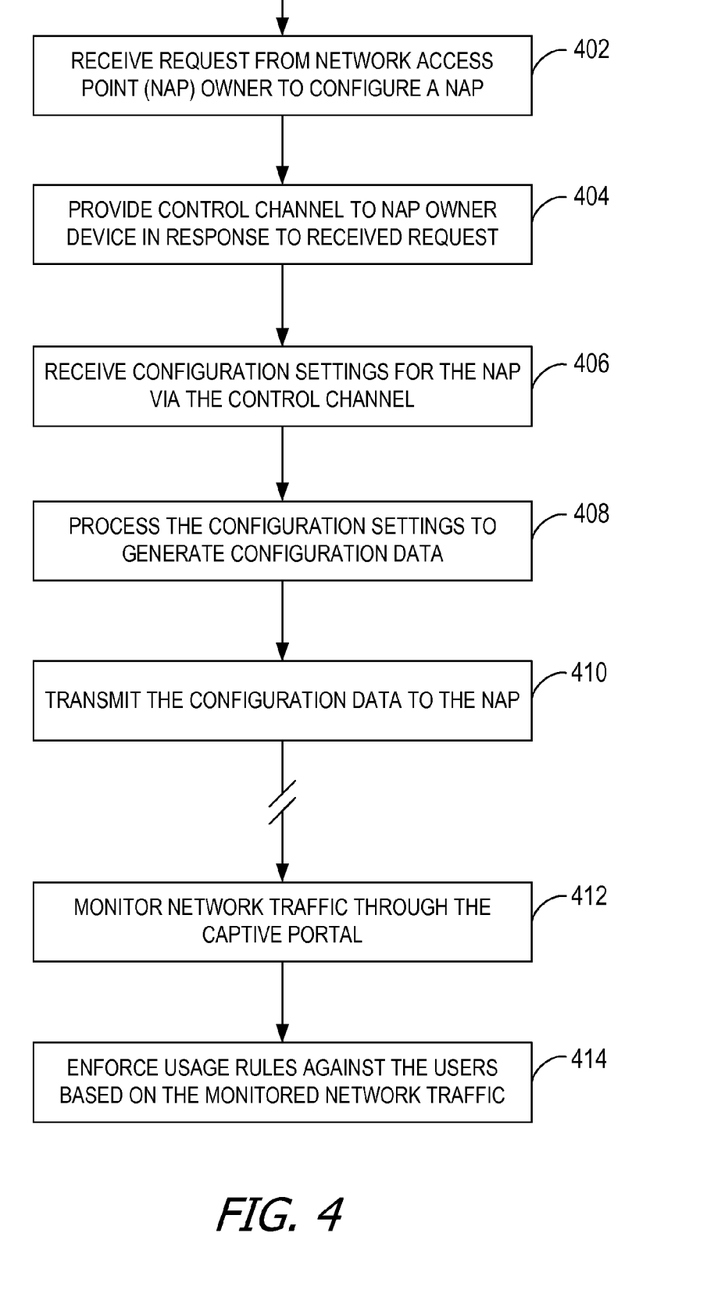
FIG. 4 is an exemplary flow chart illustrating operation of a cloud service to configure a captive portal associated with a network access point.

Referring next to FIG. 4, an exemplary flow chart illustrates operation of the cloud service 104 to configure the captive portal 202 associated with the NAP 110. The operations illustrated in FIG. 4 are described with reference to execution by the cloud service 104. However, aspects of the disclosure contemplate execution of the operations by other devices or processors, such as by one or more of the mobile computing devices 102. Further, while some operations are described with reference to execution of the computer-executable components embodied or otherwise stored in the memory area 304 of the cloud service 104, one or more of the operations may be performed by other components or modules of the cloud service 104.

At 402, the cloud service 104 receives, from the NAP owner device 204, a request to provision, setup, or otherwise configure at least one of the NAPs 110. In an example scenario, the NAP owner 206 (e.g., a restaurant owner) has purchased a new NAP 110 (e.g., a wireless router) and is ready to configure the NAP 110 to implement the captive portal 202 to provide gated access to the network 108 (e.g., the Internet) for an establishment (e.g., a restaurant). The NAP owner 206 uses the NAP owner device 204 (e.g., a laptop) to send the request to the cloud service 104. The NAP owner 206 identifies the destination of the request via, for example, a near-field communications (NFC) tag, a quick-response (QR) code on the NAP 110, and/or a uniform resource locator (URL). The NFC tag, QR code, and URL may be located on the NAP 110 itself or on packaging of the NAP 110.

In some embodiments, the request includes the NAP owner identifier 306 (e.g., a login, user name, email address, etc.) and the NAP identifier 308 (e.g., a serial number, media access control address, etc.). The request may include additional information, such as a current location of the NAP 110, make/model of the NAP 110, date of purchase, and more.

At 404, the cloud service 104 provides a control channel to the NAP owner device 204. For example, the cloud service 104 provides the NAP owner device 204 with an interface such as application programming interface (API) and/or a user interface (UI). The API and UI enable the NAP owner device 204 to send the configuration settings to the cloud service 104. Aspects of the disclosure are operable with any API, including representational state transfer (REST) styles (e.g., RESTful) and other design models.

For example, an API in accordance with embodiments of the disclosure includes commands for the NAP owner 206 to define the configuration settings. The commands convey input from the NAP owner 206. As another example, a UI in accordance with embodiments of the disclosure displays one or more configuration options to the NAP owner 206. The NAP owner 206 navigates one or more menus of the UI to identify the available configuration options, and to enter configuration settings for one or more of the configuration options.

At 406, the cloud service 104 receives the configuration settings from the NAP owner device 204 via the control channel. At 408, the cloud service 104 processes the received configuration settings to generate the configuration data 310. In some embodiments, the configuration settings identify a plurality of service providers with which the NAP owner 206 has a contractual agreement. In such embodiments, processing the received configuration settings includes generating a landing page for each of the plurality of service providers. In operation, the landing page for a particular one of the service providers is provided to the mobile computing device 102 after the user 106 of the mobile computing device 102 provides credentials identifying the particular one of the service providers. The landing page may include executable scripts for retrieving current promotions of the service provider, or other advertisements.

At 410, the cloud service 104 transmits the generated configuration data 310 to the NAP 110. The NAP 110 applies the configuration data 310 to configure the NAP 110. In some embodiments, the configuration data 310 includes machine-readable data such as XML code that the NAP 110 is capable of understanding to configure the NAP 110. Alternatively or in addition, the cloud service 104 transmits the generated configuration data 310 to the NAP owner device 204. The NAP owner device 204 then communicates with the NAP 110 to apply the configuration data 310 to the NAP 110.

In some embodiments, the cloud service 104 transmits the generated configuration data 310 to the NAP 110 as an image (e.g., firmware) to be applied to the NAP 110. Installing the image applies the configuration data 310 while maintaining user settings. In some embodiments, the image is an operating system image that represents a full re-imaging of the NAP 110 (e.g., router).

In some scenarios, the cloud service 104 receives a set of application identifiers from the NAP owner 206 as part of the configuration settings. The set of application identifiers correspond to those applications to be allowed access through the captive portal 202. For example, the application identifiers may include string names for applications such as messaging applications, audio streaming applications, and video streaming applications.

In some embodiments, the set of application identifiers corresponds to those applications the NAP 110 will allow through the captive portal 202 without authentication of the mobile computing device 102 and/or user 106. As an example, the NAP owner 206 may allow access to social media applications without redirecting the mobile computing devices 102 to the captive portal web page for authentication. In another example, the NAP owner 206 may allow access to a video teleconferencing application without authentication of the mobile computing device 102 and/or user 106 based on an agreement with one of the service providers associated with the video teleconferencing application. In this manner, transparent network access is provided to the users 106 executing the video teleconferencing application.

In another scenario, the NAP owner 206 identifies one or more mobile operators or other service providers in the configuration settings. Users 106 associated with the identified service providers are allowed to connect through the captive portal 202 to access the network 108 without paying a fee or other requirements such as viewing an advertisement, accepting terms of service, etc. In such scenarios, the NAP owner 206 charges the service providers a fee for allowing customers (e.g., the users 106) of the service providers to connect through the captive portal 202. In this manner, aspects of the disclosure enable reverse billing, or otherwise operate to subsidize a cost associated with access to the network 108 by allotting a portion of the cost to the service providers.

In still another scenario, the NAP 110 is associated with a business entity and the NAP owner 206 specifies the hours of operation for the business entity in the configuration settings. After the configuration settings are applied to the NAP 110, the NAP 110 disables access to the network 108 outside the hours of operation.

After the NAP 110 has been configured via the configuration data 310, the cloud service 104 monitors network traffic through the captive portal 202 at 412. For example, the NAP 110 intermittently or periodically sends the cloud service 104 reports detailing the network traffic by a plurality of the user 106 through the captive portal 202. The cloud service 104 analyzes the network traffic, and in some embodiments enforces the usage rules against the users 106 based on the monitored network traffic. For example, the cloud service 104 may instruct the NAP 110 to offload one or more of the current users 106 to another network 108 or NAP 110, to restrict access (e.g., throttle bandwidth) by one or more of the current users 106, and/or prevent one or more future users 106 from obtaining access through the captive portal 202.

After configuration of the NAP 110, the cloud service 104 may further use the control channel to deliver information to the NAP 110. In some scenarios, the cloud service 104 provides a redirect web page (e.g., a landing page) to the mobile computing device 102 through the control channel when the user 106 attempts to access the network 108 via the NAP 110. The NAP 110 then uses the control channel to perform authentication of the users 106 and/or authorization of the mobile computing devices 102 to connect through the captive portal 202. For example, after being presented with user credentials via the control channel, the cloud service 104 may provide instructions to the NAP 110 that this particular user 106, using the mobile computing device 102 having a particular MAC address, is allowed to connect through the captive portal 202 to the network 108 for a particular duration or until a particular amount of network data has been consumed. The NAP 110 then provides the user 106 with network access in accordance with the instructions received via the control channel.

In some embodiments, the components illustrated in FIG. 3 execute to perform one or more of the operations illustrated in FIG. 4. For example, the user interface component 312, when executed by the processor 302 of the cloud service 104, causes the processor 302 to provide a user interface for display on the NAP owner device 204. In some embodiments, the user interface component 312 provides user interface elements (e.g., menus, popups, dialog boxes, entry fields, etc.) for receiving a bandwidth configuration from the NAP owner 206, for receiving a request from the NAP owner 206 to add another captive portal 202 to the NAP 110, and more.

The NAP owner device 204 receives the configuration settings for the NAP 110 from the NAP owner 206 via the provided user interface. The communications interface component 314, when executed by the processor 302 of the cloud service 104, causes the processor 302 to receive the configuration settings from the NAP owner device 204. The configuration component 316, when executed by the processor 302 of the cloud service 104, causes the processor 302 to process the configuration settings received by the communications interface component 314 to generate the configuration data 310 for the NAP 110. In some embodiments, the configuration component 316 further creates a correlation between the NAP 110 and the NAP owner 206 (e.g., between the NAP identifier 308 and the NAP owner identifier 306).

The communications interface component 314 further executes to transmit the configuration data 310 generated by the configuration component 316 from the cloud service 104 to the NAP 110. The NAP 110 applies the transmitted configuration data 310 to configure the NAP 110. Alternatively or in addition, the communications interface component 314s transmits the configuration data 310 to the NAP owner device 204. In such an example, the NAP owner device 204 applies the configuration data 310 to the NAP 110 to configure the NAP 110.

In some embodiments, the user interface component 312 provides data to the user 106 or receives data from the user 106 via one or more of the following hardware elements on the NAP owner device 204: speakers, a sound card, a camera, a microphone, a vibration motor, one or more accelerometers, a BLUETOOTH brand communication module, global positioning system (GPS) hardware, and a photoreceptive light sensor. For example, the NAP owner 206 may input commands or manipulate data by moving the NAP owner device 204 in a particular way.

The report component 318, when executed by the processor 302 of the cloud service 104, causes the processor 302 to generate one or more reports. The reports are based on data collected from the NAP 110 and/or the cloud service 104. An exemplary report indicates an amount of network traffic, through the NAP 110, from the users 106. The report may further identify an amount of network traffic affiliated with different service providers. For example, the report indicates that the users 106 associated with Service Provider A generated 20% of overall network traffic through the NAP 110, whereas the users 106 associated with Service Provider B generated 30% of the overall network traffic through the NAP 110.

In some embodiments, the cloud service 104 provides one or more of the reports to the NAP owner 206 (e.g., transmitted to the NAP owner device 204). Continuing the above example with Service Providers A and B, the cloud service 104 provides the report (e.g., a monetization report) to the NAP owner 206 showing an amount (e.g., percentage) of network traffic associated with the users 106 who are affiliated with at least one of the service providers.

In some embodiments, each service provider pays a subsidy or other fee to the NAP owner 206 to allow the users 106 of the service provider to connect through the captive portal 202 of the NAP 110. In such embodiments, the report component 318 provides one or more of the reports to the service providers on behalf of the NAP owner 206. In this manner, the cloud service 104 markets the NAP 110 to the service providers for additional or increased subsidies from the service providers by emphasizing, for example, the quantity of the users 106 of the service providers who frequent the NAP 110.

The report component 318 may also allow the NAP owner device 204 to connect to the cloud service 104, through the control channel, to view the reports. For example, the NAP owner 206 may login to the cloud service 104, via the control channel, to view log files or other accumulated or derived data.

Additional Examples

In an example scenario, a bakery owner wants to provide Wi-Fi access to customers of the bakery. The bakery owner purchases a wireless router designed for hotspot service, and connects the wireless router to the Internet. The wireless router is pre-configured by the manufacturer to automatically attempt to connect to the cloud service 104 upon initial power up. After connection to the cloud service 104, the wireless router sends information describing the wireless router, such as serial number, MAC address, date of manufacture, make/model, hardware/software revision information, and the like.

The bakery owner uses the NAP owner device 204 (e.g., a laptop or tablet) and logs into the cloud service 104 to provide credentials to the cloud service 104 (e.g., via the control channel). The cloud service 104 associates the credentials with the information provided by the wireless router, thereby creating a correlation between the bakery owner and the hotspot. The bakery owner provides the configuration settings for the captive portal 202 to the cloud service 104, which generates and applies the configuration data 310 to the wireless router to implement the captive portal 202. The configured wireless router is then ready to provide Wi-Fi access to the customers of the bakery. In this scenario, the cloud service 104 provides the bakery owner with a fully functional captive portal 202 along with network traffic monitoring and filtering in accordance with the supplied configuration settings.

Some embodiments support auto-provisioning of additional NAPs 110. For example, after applying the configuration data 310 to at least one NAP 110, the cloud service 104 (or NAP owner device 204) stores the configuration data 310 and can apply the same configuration data 310 when the NAP owner 206 adds a new NAP 110 or a new captive portal 202 to an existing NAP 110. In such an example, the NAP owner 206 may tap the NAP owner device 204 onto an NFC tag of the new or existing NAP 110 to automatically apply the stored configuration data 310 to the new or existing NAP 110.

In some embodiments, the control channel includes a portable storage medium such as a universal serial bus (USB) flash drive or a subscriber identity module (SIM) that allows the NAP owner 206 to contact the cloud service 104 to provision the NAP 110. For example, the USB flash drive and SIM includes an application that, when executed, contacts the cloud service 104 to establish the control channel. The USB flash drive and/or SIM may be included with the packaging of the NAP 110 upon purchase.

Aspects of the disclosure further contemplate an economic model for incentivizing an owner of the captive portal to encourage the users 106 to connect through the captive portal. For example, as the volume of the users 106 connecting through a particular captive portal increases, the cloud service 104 provides additional benefits and/or services to the users 106 and/or the owner of that captive portal. The additional benefits and/or services include, but are not limited to, higher tiers of quality of service (QoS), reserved bandwidth for the owner or other users 106 identified by the owner, and the like.

At least a portion of the functionality of the various elements in the figures may be performed by other elements in the figures, or an entity (e.g., processor, web service, server, application program, computing device, etc.) not shown in the figures.

In some embodiments, the operations illustrated in FIG. 4 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "NFC" as used herein refers, in some embodiments, to a short-range high frequency wireless communication technology for the exchange of data over short distances.

While no personally identifiable information is tracked by aspects of the disclosure, embodiments have been described with reference to data monitored and/or collected from the users 106. In some embodiments, notice may be provided to the users 106 of the collection of the data (e.g., via a dialog box or preference setting) and users 106 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. In some embodiments, computer storage media are implemented in hardware. Exemplary computer storage media include hard disks, flash drives, and other solid-state memory. In contrast, communication media embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user 106 in any way, including from input devices such as a keyboard or pointing device, via gesture input, proximity input (such as by hovering), and/or via voice input.

Embodiments of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for provisioning captive portals associated with the NAPs 110. For example, one or more of the embodiments contemplate means for receiving a request from the NAP owner device 204 to configure the NAP 110; receiving, from the NAP owner device 204 via a control channel, configuration settings for the captive portal, processing the received configuration settings to generate configuration data 310 for the NAP 110; transmitting the generated configuration data 310 to the NAP 110, the NAP 110 applying the transmitted configuration data 310 to configure the NAP 110; monitoring network traffic from the users 106 through the captive portal; and enforcing the usage rules against the users 106 based on the monitored network traffic.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for provisioning a captive portal associated with a network access point (NAP), said system comprising:
   a memory area associated with a cloud service, said memory area storing a correlation between a NAP owner identifier and at least one NAP, the NAP implementing the captive portal to provide access to a network; and
   a processor programmed to:
      receive a request from a NAP owner device to configure a NAP, the request including the NAP owner identifier;
      receive, from the NAP owner device via a control channel, configuration settings for the captive portal, the configuration settings including usage rules and identification of a first service provider and a second service provider;
      process the received configuration settings to:
         generate configuration data for the NAP;
         generate a first landing page for the first service provider;
         generate a second landing page for the second service provider; and
         transmit the generated configuration data to the NAP, the NAP applying the transmitted configuration data to configure the NAP;
      monitor network traffic from a plurality of users through the captive portal; and
      enforce the usage rules against the plurality of users based on the monitored network traffic.

2. The system of claim 1, wherein the processor is further programmed to provide, in response to the received request, the control channel to the NAP owner device.

3. The system of claim 1, wherein the NAP owner device is co-located with the NAP at a location of a business entity.

4. The system of claim 1, wherein the processor is configured to enforce the usage rules by offloading one or more of the plurality of users to another network.

5. The system of claim 1, wherein the usage rules identify opt-out conditions under which access through the captive portal is prohibited.

6. A method comprising:
   receiving, by a cloud service from a network access point (NAP) owner device, a NAP identifier and a NAP owner identifier;
   providing a control channel to the NAP owner device;
   receiving, from the NAP owner device via the provided control channel, configuration settings for a captive portal associated with the NAP, the captive portal providing access to a network, the configuration settings comprising a set of application identifiers that identify one or more applications allowed to connect to the network through the captive portal without authentication;
   processing the received configuration settings to generate configuration data for the NAP; and
   transmitting the generated configuration data from the cloud service to the NAP, the NAP applying the transmitted configuration data to configure the NAP.

7. The method of claim 6, wherein the NAP is associated with a business entity, wherein receiving the configuration settings comprises receiving hours of operation for the business entity, and wherein applying the transmitted configuration data comprises disabling access to the network outside the hours of operation.

8. The method of claim 6, wherein receiving the configuration settings comprises receiving identification of one or more mobile operators, and further comprising allowing users affiliated with at least one of the one or more mobile operators to connect through the captive portal without paying a fee.

9. The method of claim 8, further comprising generating a monetization report showing an amount of network traffic associated with the users.

10. The method of claim 6, further comprising subsidizing a cost associated with the access to the network with the plurality of service providers.

11. The method of claim 6, wherein providing the control channel comprises providing at least one of an application programming interface (API) or a user interface (UI).

12. One or more computer storage media embodying computer-executable components, said components comprising:
   a user interface component that when executed causes at least one processor of a cloud service to provide a user interface for display on a network access point (NAP) owner device, the NAP owner device receiving configuration settings for a NAP from a NAP owner via the provided user interface;
   a communications interface component that when executed causes at least one processor to receive the configuration settings from the NAP owner device, the configuration settings defining access by a plurality of users to a network through a captive portal implemented by the NAP; and
   a configuration component that when executed causes at least one processor to process the configuration settings received by the communications interface component to:
      generate configuration data for the NAP;
      generate a first landing page for the first service provider;

generate a second landing page for the second service provider; and wherein the communications interface component further transmits the configuration data generated by the configuration component from the cloud service to the NAP, the NAP applying the transmitted configuration data to configure the NAP.

13. The computer storage media of claim 12, wherein the configuration component further creates a correlation between the NAP and the NAP owner.

14. The computer storage media of claim 12, wherein the user interface component provides user interface elements for receiving a bandwidth configuration from the NAP owner.

15. The computer storage media of claim 12, wherein the user interface component provides user interface elements for receiving a request to add another captive portal to the NAP.

16. The computer storage media of claim 12, further comprising a report component that when executed causes at least one processor to generate a report indicating an amount of network traffic, through the NAP, from users affiliated with a service provider.

17. The computer storage media of claim 16, wherein the report component further provides the report to the service provider on behalf of the NAP owner to market the NAP for additional subsidies from the service provider.

18. The system of claim 1, wherein the first landing page is different than the second landing page.

19. The system of claim 1, wherein the configuration settings further comprise a set of application identifiers, the set identifying one or more applications allowed to connect to the network through the captive portal without authentication.

20. The method of claim 6, wherein the configuration settings comprising a rule whereby authentication is a pre-requisite for an application to connect to the network through the captive portal if the application does not have an application identifier that enables the application to connect to the network through the captive portal without authentication.

\* \* \* \* \*